US012383101B2

(12) United States Patent
Uchendu

(10) Patent No.: US 12,383,101 B2
(45) Date of Patent: Aug. 12, 2025

(54) HEATED FOOD PROCESSOR

(71) Applicant: SHARKNINJA OPERATING LLC, Needham, MA (US)

(72) Inventor: Chizoba Brendan Uchendu, Boston, MA (US)

(73) Assignee: SharkNinja Operating LLC, Needham, MA (US)

( * ) Notice: Subject to any disclaimer, the term of this patent is extended or adjusted under 35 U.S.C. 154(b) by 713 days.

(21) Appl. No.: 17/613,722

(22) PCT Filed: May 27, 2020

(86) PCT No.: PCT/US2020/034664
§ 371 (c)(1),
(2) Date: Nov. 23, 2021

(87) PCT Pub. No.: WO2020/243150
PCT Pub. Date: Dec. 3, 2020

(65) Prior Publication Data
US 2022/0225833 A1 Jul. 21, 2022

Related U.S. Application Data

(60) Provisional application No. 62/853,628, filed on May 28, 2019.

(51) Int. Cl.
A47J 43/046 (2006.01)
A47J 43/07 (2006.01)
A47J 27/00 (2006.01)

(52) U.S. Cl.
CPC ......... A47J 43/046 (2013.01); A47J 43/0722 (2013.01); A47J 27/004 (2013.01); A47J 2202/00 (2013.01)

(58) Field of Classification Search
CPC .... A47J 43/046; A47J 43/0722; A47J 43/004; B01F 35/90; B01F 35/98; B01F 35/99; B01F 35/2215
See application file for complete search history.

(56) References Cited

U.S. PATENT DOCUMENTS

| 4,108,054 A | 8/1978 | Klocker et al. |
| 4,137,834 A | 2/1979 | Uibel |

(Continued)

FOREIGN PATENT DOCUMENTS

| BE | 1019694 | 10/2012 |
| CH | 701427 | 1/2011 |

(Continued)

OTHER PUBLICATIONS

International Preliminary Report on Patentability in Application No. PCT/US20/034664 dated Dec. 9, 2021, 10 pages.

(Continued)

Primary Examiner — Marc C Howell
(74) Attorney, Agent, or Firm — The Webb Law Firm

(57) ABSTRACT

A food processing system includes a food processing base, an attachment configurable with said food processing base, said attachment including a processing chamber, a heat distribution element for transferring heat to a fluid within said processing chamber, and a controller associated with the system. The controller is programmable to evaluate a plurality of successive changes in temperature of said heat distribution element, and a value of each temperature change between each of said plurality of successive changes in temperature to determine if a fluid temperature in said processing chamber is equal to a target temperature.

28 Claims, 5 Drawing Sheets

(56) References Cited

U.S. PATENT DOCUMENTS

| | | | |
|---|---|---|---|
| 4,620,953 | A | 11/1986 | Silla et al. |
| 4,649,810 | A | 3/1987 | Wong |
| 5,768,978 | A | 6/1998 | Dorner et al. |
| 5,794,524 | A | 8/1998 | Kemker et al. |
| 5,882,113 | A | 3/1999 | Binder |
| 6,065,861 | A | 5/2000 | Chen |
| 9,211,028 | B2 | 12/2015 | Cheung et al. |
| 9,211,032 | B2 | 12/2015 | Larson et al. |
| 11,058,253 | B2 | 7/2021 | Kim |
| 11,445,860 | B2 | 9/2022 | Ortmann et al. |
| 2002/0027175 | A1* | 3/2002 | Capp ............ A47J 43/046 241/199.12 |
| 2007/0092618 | A1 | 4/2007 | Burnell et al. |
| 2008/0264270 | A1 | 10/2008 | Peng |
| 2012/0205475 | A1* | 8/2012 | Wu ............... A47J 43/046 366/205 |
| 2013/0248627 | A1 | 9/2013 | Huang et al. |
| 2015/0101491 | A1* | 4/2015 | Lin ............... A47J 27/004 99/348 |
| 2015/0117137 | A1* | 4/2015 | Haney ........... A47J 43/046 366/205 |
| 2015/0165402 | A1* | 6/2015 | King ............. B01F 35/32025 366/145 |
| 2015/0305567 | A1* | 10/2015 | Koetz ........... B01F 35/2206 366/342 |
| 2017/0071413 | A1* | 3/2017 | Park ............. A47J 27/004 |
| 2018/0140138 | A1* | 5/2018 | Kim .............. A47J 43/07 |
| 2018/0177340 | A1* | 6/2018 | Kraut-Reinkober ............. A47J 27/004 |
| 2018/0206677 | A1 | 7/2018 | Ivarsson et al. |
| 2018/0242773 | A1 | 8/2018 | Yu et al. |
| 2018/0259191 | A1 | 9/2018 | Polster |
| 2019/0269578 | A1* | 9/2019 | Goodin ......... A47J 36/2433 |
| 2019/0307287 | A1* | 10/2019 | Magatti ........ A47J 31/44 |

FOREIGN PATENT DOCUMENTS

| | | |
|---|---|---|
| CN | 1889844 A | 1/2007 |
| CN | 206062969 | 4/2017 |
| CN | 107661038 A | 2/2018 |
| CN | 107773039 A | 3/2018 |
| CN | 107809930 A | 3/2018 |
| CN | 107928379 A | 4/2018 |
| CN | 107949305 | 4/2018 |
| CN | 108731035 A | 11/2018 |
| CN | 109363485 A | 2/2019 |
| DE | 1289966 | 2/1969 |
| DE | 7531236 | 2/1976 |
| DE | 2651237 | 5/1978 |
| DE | 8016184 | 9/1980 |
| DE | 3633452 | 4/1988 |
| DE | 29815934 | 1/1999 |
| DE | 202012005844 | 11/2012 |
| DE | 202013100134 | 4/2013 |
| DE | 202017105062 | 2/2018 |
| DE | 102018203719 | 9/2019 |
| EP | 0157069 | 10/1985 |
| EP | 0197055 | 10/1986 |
| EP | 0248490 | 12/1987 |
| EP | 0235258 | 3/1991 |
| EP | 0428811 | 5/1991 |
| EP | 0350380 | 2/1993 |
| EP | 0556467 | 8/1993 |
| EP | 0432615 | 2/1994 |
| EP | 0795289 | 9/1997 |
| EP | 0757530 | 6/1998 |
| EP | 0757531 | 6/1998 |
| EP | 0757533 | 6/1999 |
| EP | 0996351 | 5/2000 |
| EP | 0757529 | 6/2000 |
| EP | 1050261 | 11/2000 |
| EP | 0963726 | 8/2001 |
| EP | 1267638 | 1/2003 |
| EP | 1361917 | 8/2004 |
| EP | 1221883 | 11/2005 |
| EP | 1309245 | 3/2006 |
| EP | 1647217 | 4/2006 |
| EP | 1677654 | 7/2006 |
| EP | 1517632 | 9/2006 |
| EP | 1520498 | 10/2006 |
| EP | 1733664 | 12/2006 |
| EP | 1642518 | 2/2007 |
| EP | 1483989 | 4/2007 |
| EP | 1732426 | 8/2007 |
| EP | 1731068 | 10/2007 |
| EP | 1905332 | 4/2008 |
| EP | 1500332 | 9/2008 |
| EP | 1987747 | 11/2008 |
| EP | 2036472 | 3/2009 |
| EP | 2042063 | 4/2009 |
| EP | 2059157 | 5/2009 |
| EP | 1561409 | 7/2009 |
| EP | 1932458 | 11/2009 |
| EP | 1820427 | 4/2010 |
| EP | 2206455 | 7/2010 |
| EP | 2355681 | 8/2012 |
| EP | 2489291 | 8/2012 |
| EP | 2273904 | 10/2012 |
| EP | 2503923 | 10/2012 |
| EP | 2522261 | 11/2012 |
| EP | 2210542 | 12/2012 |
| EP | 2323525 | 1/2013 |
| EP | 2543293 | 1/2013 |
| EP | 2611343 | 7/2013 |
| EP | 2225981 | 4/2014 |
| EP | 2429359 | 4/2014 |
| EP | 2509478 | 7/2014 |
| EP | 2538825 | 12/2014 |
| EP | 2807968 | 12/2014 |
| EP | 2921031 | 9/2015 |
| EP | 2931096 | 10/2015 |
| EP | 2152127 | 12/2015 |
| EP | 2777450 | 2/2016 |
| EP | 3011878 | 4/2016 |
| EP | 2884875 | 5/2016 |
| EP | 2865303 | 7/2016 |
| EP | 3090667 | 11/2016 |
| EP | 3141170 | 3/2017 |
| EP | 2925199 | 5/2017 |
| EP | 2958435 | 11/2017 |
| EP | 2433525 | 1/2018 |
| EP | 3292803 | 3/2018 |
| EP | 3302400 | 4/2018 |
| EP | 3320814 | 5/2018 |
| EP | 3220789 | 6/2018 |
| EP | 2548636 | 8/2018 |
| EP | 3386355 | 10/2018 |
| EP | 2925198 | 11/2018 |
| EP | 3308685 | 1/2019 |
| EP | 2925200 | 5/2019 |
| EP | 3510905 | 7/2019 |
| EP | 3232881 | 9/2019 |
| EP | 3448211 | 10/2019 |
| EP | 3566624 | 11/2019 |
| EP | 3153080 | 6/2020 |
| EP | 3498138 | 7/2020 |
| EP | 3681336 | 7/2020 |
| EP | 3685718 | 7/2020 |
| EP | 3376912 | 9/2020 |
| EP | 3395219 | 9/2020 |
| EP | 3641563 | 9/2020 |
| EP | 3713464 | 9/2020 |
| EP | 3725162 | 10/2020 |
| EP | 3771388 | 2/2021 |
| EP | 3782521 | 2/2021 |
| EP | 3790433 | 3/2021 |
| EP | 3813616 | 5/2021 |
| EP | 3536205 | 6/2021 |
| EP | 3830487 | 6/2021 |
| EP | 3518718 | 9/2021 |
| EP | 3892173 | 10/2021 |
| EP | 3895585 | 10/2021 |
| EP | 3897322 | 10/2021 |

(56) References Cited

FOREIGN PATENT DOCUMENTS

| | | |
|---|---|---|
| EP | 3937735 | 1/2022 |
| EP | 3386361 | 2/2022 |
| EP | 3975806 | 4/2022 |
| ES | 2319085 | 5/2009 |
| ES | 2348375 | 12/2010 |
| FR | 1345880 | 12/1963 |
| FR | 2578159 | 9/1986 |
| GB | 450324 | 7/1936 |
| GB | 622115 | 4/1949 |
| GB | 1037180 | 7/1966 |
| GB | 1576302 | 10/1980 |
| GB | 2077128 | 12/1981 |
| GB | 2078340 | 1/1982 |
| GB | 2196238 | 4/1988 |
| GB | 2390985 | 1/2004 |
| GB | 2435434 | 8/2007 |
| GB | 2449870 | 12/2008 |
| GB | 2493447 | 2/2013 |
| GB | 2495218 | 4/2013 |
| GB | 2495386 | 4/2013 |
| GB | 2547895 | 9/2017 |
| GB | 2552156 | 1/2018 |
| GB | 2564305 | 1/2019 |
| GB | 2586644 | 3/2021 |
| JP | 2017119069 A | 7/2017 |
| KR | 1020170028280 A | 3/2017 |
| WO | 1986001988 | 4/1986 |
| WO | 1987001021 | 2/1987 |
| WO | 1995029614 | 11/1995 |
| WO | 1999003384 | 1/1999 |
| WO | 2001074174 | 10/2001 |
| WO | 2005037036 | 4/2005 |
| WO | 2008029076 | 3/2008 |
| WO | 2011064145 | 6/2011 |
| WO | 2011105943 | 9/2011 |
| WO | 2012030826 | 3/2012 |
| WO | 2014075923 | 5/2014 |
| WO | 2014091506 | 6/2014 |
| WO | 2016196568 | 12/2016 |
| WO | 2017097674 | 6/2017 |
| WO | 2019101764 | 5/2019 |
| WO | 2019102147 | 5/2019 |
| WO | 2019214834 | 11/2019 |
| WO | 2020000052 | 1/2020 |
| WO | 2020039280 | 2/2020 |
| WO | 2020124137 | 6/2020 |
| WO | 2020187505 | 9/2020 |
| WO | 2020243150 | 12/2020 |

OTHER PUBLICATIONS

International Search Report and Written Opinion in Application No. PCT/US20/34664 dated Aug. 3, 2020, 11 pages.
Decision of Rejection in Chinese Application No. 202080054492.6 dated Dec. 20, 2023 (with English translation), 13 pages.
Second Office Action in Chinese Application No. 202080054492.6 dated Oct. 9, 2023 (with English translation), 13 pages.
Extended European Search Report in Application No. 20814429.5 dated Jan. 9, 2023 (10 phs.).

* cited by examiner

HEATED FOOD PROCESSOR

CROSS REFERENCE TO RELATED APPLICATIONS

This is a National Stage Application filed under 35 U.S.C. 371 based on International Patent Application No. PCT/US2020/034664, filed on May 27, 2020, which claims the benefit of U.S. Provisional Application No. 62/853,628, filed on May 28, 2019, the disclosures of both of which are incorporated herein by reference in their entireties.

BACKGROUND

Exemplary embodiments of the present invention relate to a food processor, and more particularly to a container of a food processor configured to receive one or more food items therein.

Food processors are commonly used to process a plurality of different food products, including liquids, solids, semi-solids, gels and the like. It is well-known that food processors are useful devices for blending, cutting, and dicing food products in a wide variety of commercial settings, including home kitchen use, professional restaurant or food services use, and large-scale industrial use. They offer a convenient alternative to chopping or dicing by hand, and often come with a range of operational settings and modes adapted to provide specific types or amounts of food processing, e.g., as catered to particular food products.

Food preparation often requires heating one or more food items in addition to mixing foods together. Integration of a heater into a food processor increases the functionality of the food processor, by providing a single system that may be capable of performing an entire food preparation process.

SUMMARY

According to an embodiment, a food processing system includes a food processing base, an attachment configurable with said food processing base, said attachment including a processing chamber, a heat distribution element for transferring heat to a fluid within said processing chamber, and a controller associated with the system. The controller is programmable to evaluate a plurality of successive changes in temperature of said heat distribution element, and a value of each temperature change between each of said plurality of successive changes in temperature to determine if a fluid temperature in said processing chamber is equal to a target temperature.

In addition to one or more of the features described above, or as an alternative, in further embodiments said controller is programmable to perform a plurality of successive control operations, each of said plurality of successive changes in temperature of said heat distribution element being determined for said plurality of successive control operations.

In addition to one or more of the features described above, or as an alternative, in further embodiments said fluid temperature in said processing chamber is equal to a target temperature when said value of each temperature change between each of said successive changes in temperature is within an allowable tolerance.

In addition to one or more of the features described above, or as an alternative, in further embodiments said allowable tolerance is 1%.

In addition to one or more of the features described above, or as an alternative, in further embodiments said attachment further comprises at least one heating element located remotely from said processing chamber.

In addition to one or more of the features described above, or as an alternative, in further embodiments said attachment further comprises a container body having a first end and a second end defining said processing chamber being; and a processing assembly at least partially arranged within said processing chamber.

In addition to one or more of the features described above, or as an alternative, in further embodiments said heat distribution element seals said second end of said container body.

In addition to one or more of the features described above, or as an alternative, in further embodiments said heat distribution element forms a portion of said container body.

In addition to one or more of the features described above, or as an alternative, in further embodiments said processing assembly is connectable to said second end of said container body and said heat distribution element is a portion of said processing assembly.

In addition to one or more of the features described above, or as an alternative, in further embodiments comprising a sensor for detecting said changes in temperature of said heat distribution element said sensor being operably coupled to said controller.

In addition to one or more of the features described above, or as an alternative, in further embodiments said target temperature is less than or equal to a maximum allowable temperature.

In addition to one or more of the features described above, or as an alternative, in further embodiments said food processing system is operable in a plurality of modes and said maximum allowable temperature is determined in response to a selected mode of said plurality of modes.

According to another embodiment, a method of controlling a temperature in a container of a food processing system includes transferring heat to a processing chamber of the container, evaluating a plurality of successive changes in temperature of a heat distribution element associated with the container, and evaluating a value of each temperature change between each of said plurality of successive changes in temperature to determine if a fluid temperature in said processing chamber is equal to a target temperature.

In addition to one or more of the features described above, or as an alternative, in further embodiments comprising maintaining said fluid temperature of said processing chamber below a maximum temperature.

In addition to one or more of the features described above, or as an alternative, in further embodiments said maximum temperature varies in response to a mode of operation of the food processing system.

In addition to one or more of the features described above, or as an alternative, in further embodiments said maximum temperature is about 100° C.

In addition to one or more of the features described above, or as an alternative, in further embodiments said maximum temperature is about 82° C.

In addition to one or more of the features described above, or as an alternative, in further embodiments said maximum temperature is about 71° C.

In addition to one or more of the features described above, or as an alternative, in further embodiments comprising performing a plurality of successive control operations, each of said plurality of successive changes in temperature of said heat distribution element being determined for said plurality of successive control operations.

In addition to one or more of the features described above, or as an alternative, in further embodiments said change in temperature of said heat distribution element for each of said plurality of successive control operations further comprises heating said heat distribution element to a first temperature, performing at least one processing step, sensing a second temperature of said heat distribution element after said performing at least one processing step, and comparing said first temperature and said second temperature.

In addition to one or more of the features described above, or as an alternative, in further embodiments said fluid temperature of the container is equal to said target temperature when said value of each temperature change between each of said successive changes in temperature is within an allowable tolerance.

In addition to one or more of the features described above, or as an alternative, in further embodiments said allowable tolerance is 1%.

In addition to one or more of the features described above, or as an alternative, in further embodiments said fluid temperature of the container is not at said target temperature when said value of each temperature change between each of said successive changes in temperature exceeds an allowable tolerance.

According to yet another embodiment, a food processing system includes a food processing base an attachment configurable with said food processing base, said attachment including a processing chamber, a heating element operable to heat a fluid in said processing chamber, and a controller associated with the system. The controller is programmable to operate said heating element in a plurality of modes. Each of said plurality of modes is associated with a distinct target temperature of said processing chamber and at least one of said distinct target temperatures being below 100° C.

In addition to one or more of the features described above, or as an alternative, in further embodiments said controller is programmable to operate said heating element in each of said plurality of modes to heat said processing chamber to said target temperature without exceeding said target temperature.

In addition to one or more of the features described above, or as an alternative, in further embodiments said target temperature is below 82° C.

In addition to one or more of the features described above, or as an alternative, in further embodiments said target temperature is below 71° C.

In addition to one or more of the features described above, or as an alternative, in further embodiments said heating element is located remotely from said processing chamber.

In addition to one or more of the features described above, or as an alternative, in further embodiments said attachment further comprises a container body having a first end and a second end defining said processing chamber being; and a processing assembly at least partially arranged within said processing chamber.

In addition to one or more of the features described above, or as an alternative, in further embodiments comprising a heat distribution element in a heat transfer relationship with said heating element and said processing chamber.

In addition to one or more of the features described above, or as an alternative, in further embodiments said heat distribution element seals said second end of said container body.

In addition to one or more of the features described above, or as an alternative, in further embodiments said heat distribution element forms a portion of said container body.

In addition to one or more of the features described above, or as an alternative, in further embodiments said processing assembly is connectable to said second end of said container body and said heat distribution element is a portion of said processing assembly.

In addition to one or more of the features described above, or as an alternative, in further embodiments comprising a sensor for detecting a change in temperature of said heat distribution element said sensor being operably coupled to said controller.

BRIEF DESCRIPTION OF THE FIGURES

The accompanying drawings incorporated in and forming a part of the specification embodies several aspects of the present invention and, together with the description, serves to explain the principles of the invention. In the drawings.

The detailed description explains embodiments of the invention, together with advantages and features, by way of example with reference to the drawings.

DETAILED DESCRIPTION

Figure 1:
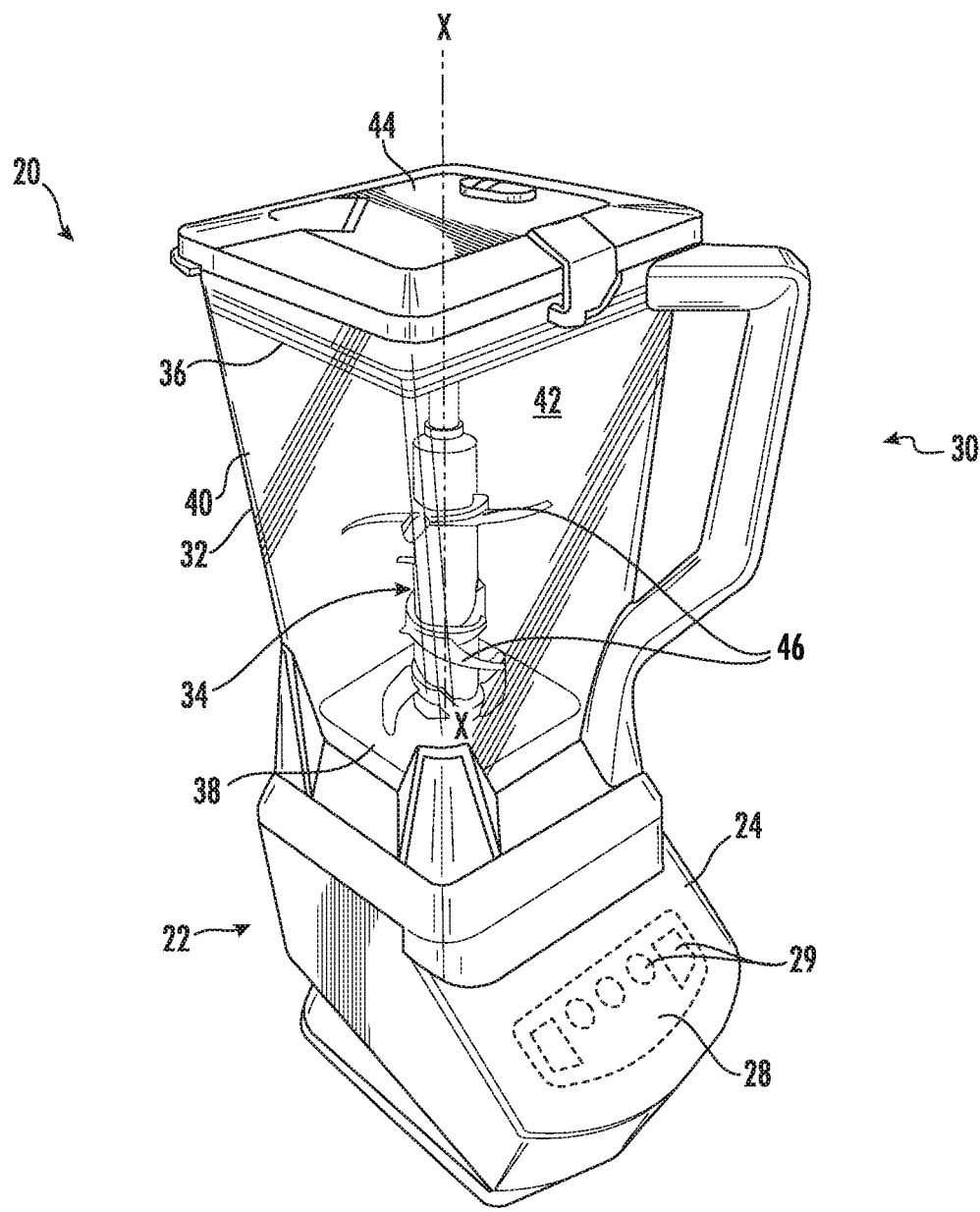
FIG. 1 is a perspective view of an example of an attachment suitable for use with a food processing system.

Referring now to FIG. 1, is an example of a multi-functional food processing system 20 is illustrated. In general, the food processing system 20 can be adapted to perform any food processing or blending operation including as non-limiting examples, dicing, chopping, cutting, slicing, mixing, blending, stirring, crushing, or the like.

The food processing system 20 includes a base 22 having a body or housing 24 within which a motorized unit M (see FIG. 4) and at least one controller 64 (see FIG. 4) are located. The base 22 includes at least one rotary component, such as a drive coupler (not shown) for example, driven by the motorized unit located within the housing 24. The base 22 additionally includes a control panel or user interface 28 having one or more inputs 29 for turning the motorized unit on and off and for selecting various modes of operation, such as pulsing, blending, or continuous food processing. The at least one drive coupler is configured to engage a portion of an attachment 30 coupled to the base 22 for the processing of food products located within an interior of the attachment 30. This will become more apparent in subsequent FIGS. and discussion.

One or more attachments 30 varying in size and/or functionality may be configured for use with the base 22. A first attachment illustrated in FIG. 1 includes a jar or container 32 having a rotatable blade assembly 34. In some embodiments, the container 32 is a pitcher sized to hold approximately 72 fluid ounces. However, embodiments where the container 32 has a larger or smaller capacity are also within the scope of the disclosure. As shown, the container 32 typically includes a first open end 36, a second closed end 38, and one or more sidewalls 40 extending between the first end 36 and the second end 38 to define a processing chamber 42 of the container 32. A rotatable blade assembly 34 may be integrally formed with the second end 38 of the container 32, or alternatively, may be removably coupled thereto. The attachment 30 may additionally include an accessory, such as a lid 44 configured to couple to the first open end 36 of the container 32 to seal the container 32. The second closed end 38 of the attachment is configured to mount to the base 22 to perform a food processing operation. Accordingly, the orientation of the container 32 when the attachment 30 is connected to the base 22 and separated from the base 22 remains generally constant. However, it should be understood that other attachments, such as a personal blender container having a first configuration when separated from the base 22 and a second inverted configuration when coupled to the base 22 and a rotatable blade assembly 34 configured to removably couple to the container are also within the scope of the disclosure.

In each of the various attachment configurations, the rotatable blade assembly 34 is configured to couple to the base 22 of the food processing system 20. A driven coupler (not shown) associated with at least one blade 46 of the rotatable blade assembly 34 is positioned at an exterior of the rotatable blade assembly 34. The at least one drive coupler is configured to engage the driven coupler to rotate the at least one blade 46 about an axis X (see FIG. 1) to process the food products located within the processing chamber 42 of the attachment 30. It should be understood that the attachments 30 illustrated and described herein are intended as an example only, and that other attachments suitable for use with the base 22, are also contemplated herein.

Figure 2:
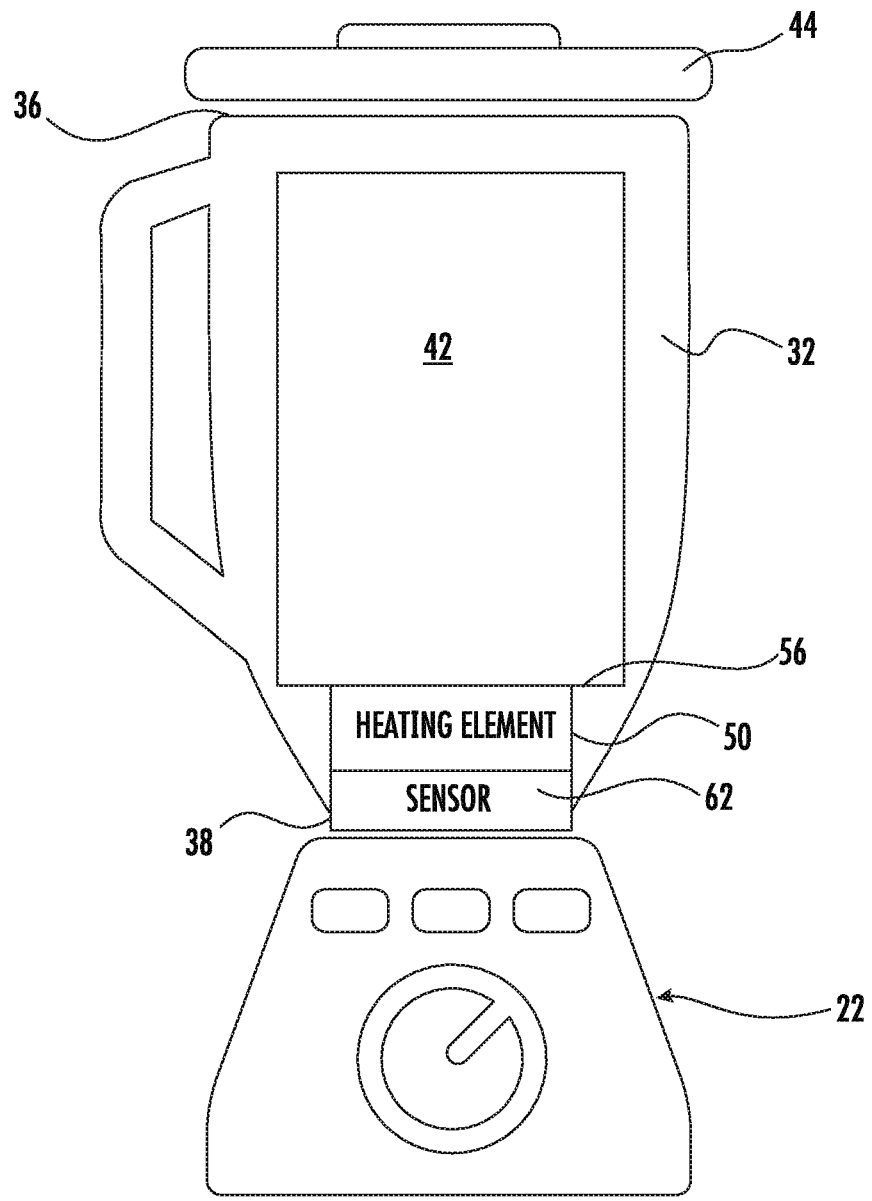
FIG. 2 is a schematic view of a food processing system according to an embodiment.
Figure 3:
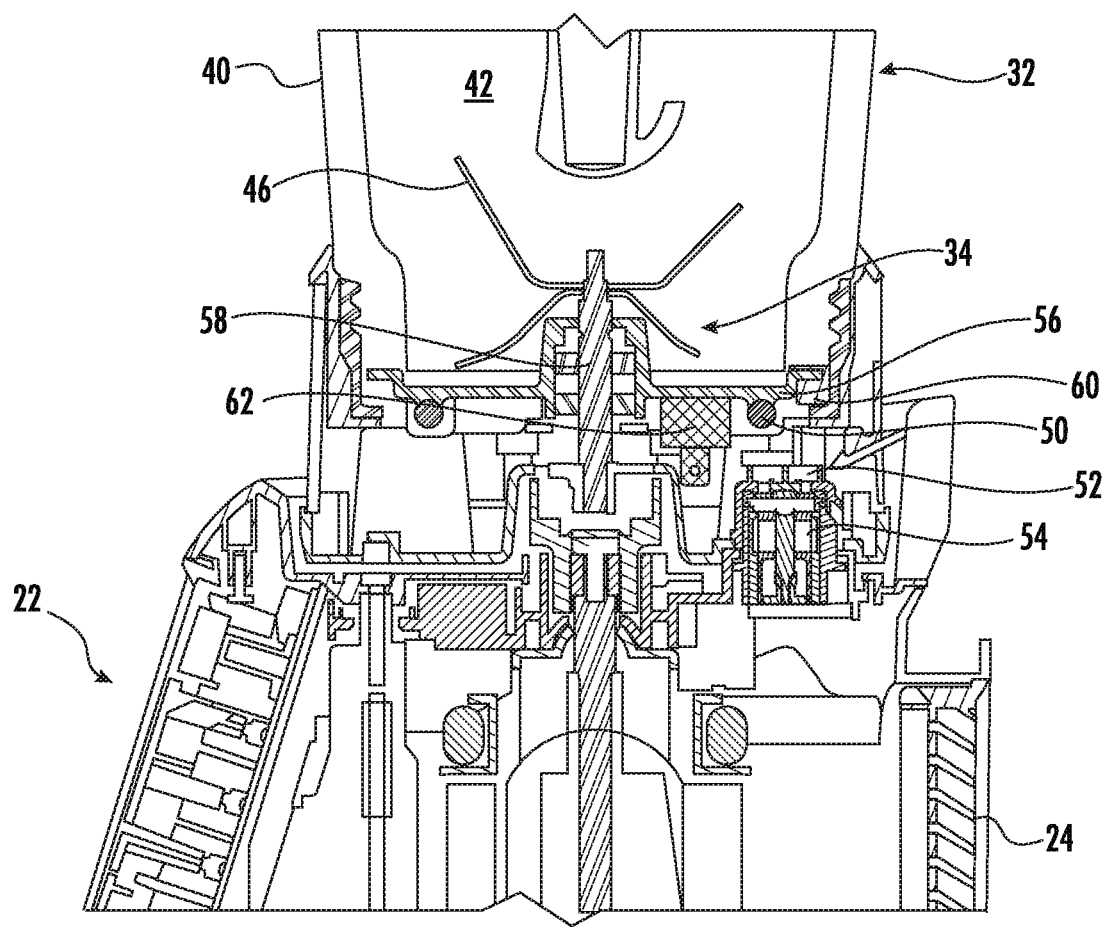
FIG. 3 is a cross-sectional view of a portion of a food processing system according to an embodiment.

With reference now to FIGS. 2 and 3, in an embodiment, the container 32 of the attachment 30, for example the pitcher container as shown in FIG. 1, includes a heating element 50 selectively operable to heat the contents of the processing chamber 42. Although a single heating element 50 is illustrated and described herein, it should be understood that embodiments having multiple heating elements 50 are also within the scope of the disclosure. The heating element 50 may be located at any suitable position about to the container 32. In the illustrated, non-limiting embodiment, best shown in FIG. 3, the heating element 50 is arranged adjacent the second end 38 of the container 32, for example at an underside of the container 32 near the driven coupling.

An upper connector 52 including one or more contactors or prongs is coupled to the heating element 50 adjacent the underside of the second end 38. When the container 32 is seated on the base 22, the upper connector 52 mates or contacts a corresponding lower connector 54 mounted on the base 22 (see FIG. 3), to deliver power from a circuit within the base 22 to the heating element 50. However, any suitable connection or mechanism for delivering power to the heating element 50 is contemplated herein.

With continued reference to FIG. 3, a heat distribution element 56 is located upwardly adjacent the heating element 50 at the second end 38 of the container 32. Accordingly, a shaft 58 supporting the at least one blade 46 of the rotatable blade assembly 34 extends through the heat distribution element 56 and into the processing chamber 42. The heat distribution element 56 may have a size and shape generally complementary to the container 32 at its mounted position. In the illustrated, non-limiting embodiment, the heat distribution element 56 seals the second end 38 of the processing chamber 42. In such embodiments, a gasket 60 is positioned about the outer periphery of the heat distribution element 56 to prevent any contents of the processing chamber 42 from leaking onto the heating element or corresponding electronic components. Further, in embodiments where the heat distribution element 56 seals the second end 38 of container 32, the heat distribution element 56 may be incorporated into the container 32 directly, or alternatively, may be integrated into a portion of a rotatable blade assembly 34 connectable to the second end 38 of the container 32.

The heat distribution element 56 may be formed from a metal, or another suitable material having a high coefficient of thermal conductivity. The heat distribution element 56 is heated by operation of the heating element 50, such as via conduction, radiation, or induction for example. Heat from the heat distribution element 56 is then transferred to the contents of the processing chamber 42, such as via conduction. However, heat may be transferred from the heat distribution element 56 to the contents of the processing chamber 42 via any suitable heat transfer process, including conduction, convection, and radiation. Although the heat distribution element 56 is illustrated and described herein with respect to an attachment 30 including a pitcher container, any attachment, such as a personal blender attachment including an inverted container for example, may be adapted for use with a heating element 50.

Figure 4:
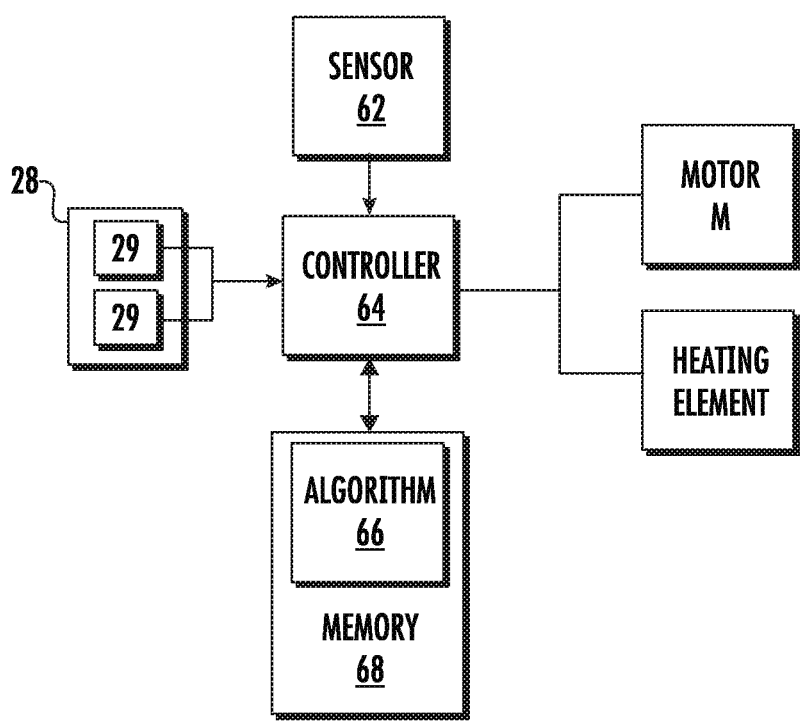
FIG. 4 is a schematic diagram of a control system of the food processing system according to an embodiment.

With continued reference to FIGS. 2 and 3, and further reference to FIG. 4, the container 32 may additionally include a sensor 62 operable to monitor a temperature of at least one of the heating elements 50 and the heat distribution element 56. In an embodiment, the sensor 62 is mounted in contact with a surface of the heat distribution element 56. The sensor 62 is operatively coupled to a controller 64 located within the base 22 and communicates signals indicating the sensed temperature thereto. The sensor 62 may be wired to the controller 64, or alternatively, may be able to communicate with the controller 64 wirelessly.

During a heating operation of the food processing system 20, the sensed temperature of the heat distribution element 56 is provided to the controller 64. The temperature may be sensed and communication continuously or at predetermined time intervals. In response to the sensed temperature, the controller 64 may vary operation of the heating element 50. For example, if the sensed temperature of the heat distribution element 56 is below a target temperature, the controller 64 may increase the power provided to the heating element 50. Similarly, if the sensed temperature is above a target temperature, the controller 64 may decrease the power provided to the heating element 50, or cease operation of the heating element 50 entirely.

Because the heating element 50 is mounted at a localized region of the container 32, remote from the processing chamber 42, the contents of the processing chamber 42 positioned directly adjacent the heat distribution element 56 will heat more quickly than the contents located remotely from the heat distribution element 56. Because of this resulting temperature gradient, the temperature of the heat distribution element 56 detected by the sensor 62 does not accurately represent the temperature of all of the contents within the processing chamber 42. Accordingly, during a heating operation, the controller 64 may execute an algorithm 66 to determine the temperature of the processing chamber 42. The algorithm 66 may be stored within a memory 68 accessible by the controller 64.

Figure 5:
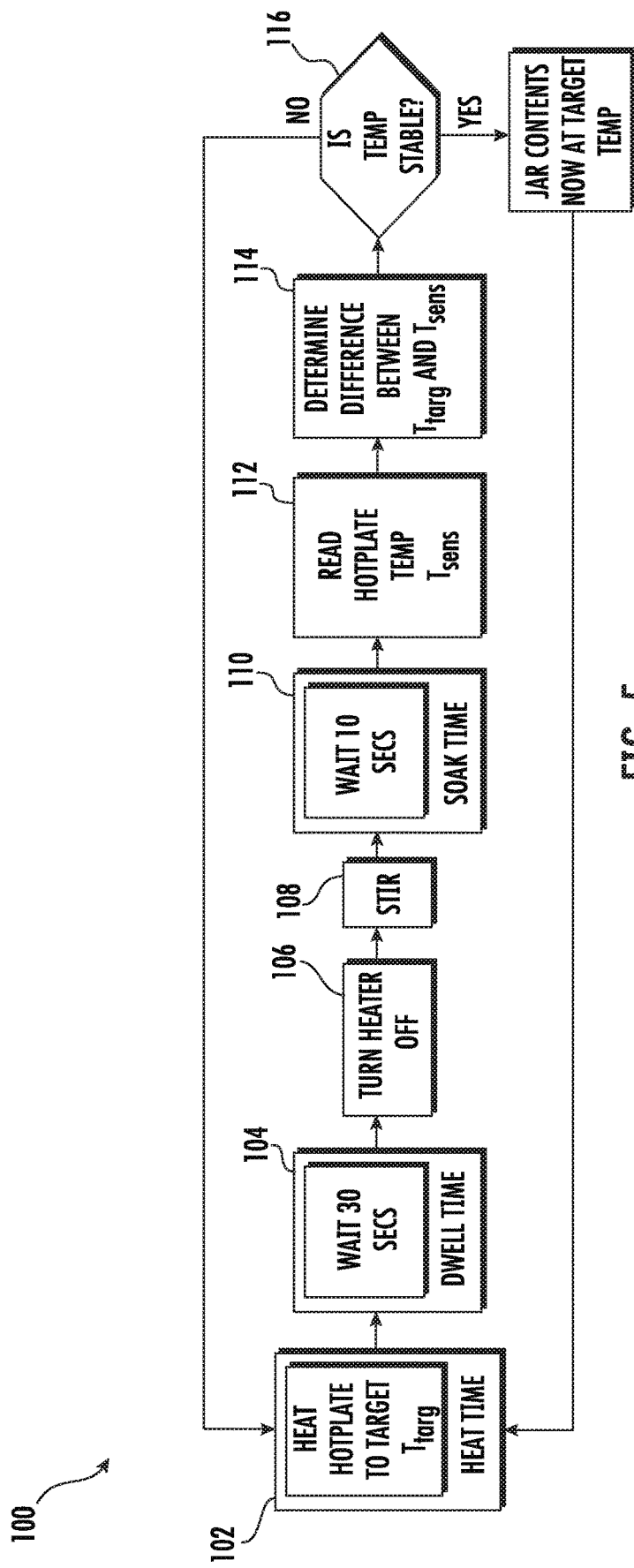
FIG. 5 is a flow diagram of a control sequence of an algorithm according to an embodiment.

With reference now to FIG. 5, the algorithm 66 includes a repeatable control sequence 100 for evaluating the fluid temperature within the processing chamber 42. As shown, in a first step 102, the heating element 50 is energized to heat the heat distribution element 56 to a target temperature. The sensor 62 may be used to monitor the temperature of the heat distribution element 56 to identify when the heat distribution element 56 has reached the target temperature. The length of time required to achieve the target temperature will vary based on both the target temperature and the initial temperature of the heat distribution element 56. Once the heat distribution element 56 reaches the target temperature, the heating element 50 remains energized to maintain the heat distribution element 56 at the target temperature, as shown in step 104, for a predetermined period of time. The period of time that the heating element 50 remains operational after the heat distribution element 56 has reached the target temperature is also referred to herein as a "dwell" time. The dwell time may be any suitable length of time, including but not limited to at least 30 seconds, at least 60 second, and at least 90 seconds. During the dwell time, heat from the heat distribution element 56 is transferred to the contents of the processing chamber 42.

In step 106, the heating element 50 is de-energized, and in step 108, the rotatable blade assembly 34 is rotated about its axis X (see FIG. 1) to stir the contents of the processing chamber 42. The stirring operation performed in step 108 may be a quick 1 second pulse, or alternatively, may be a longer continuous or discontinuous rotation of the at least one blade 46. Stirring the contents of the processing chamber 42 facilitates a more even distribution of heat across the contents of the processing chamber 42 by moving different portions of the contents into contact with the heat distribution element 56. In step 110, after the stirring operation, the food processing system 20 remains inactive or paused for a predetermined period of time, also referred to herein as "soak" time, such as 10 seconds for example. During this soak time, heat from the heat distribution element 56 will continue to transfer to the contents of the processing chamber 42, even though the heating element 50 is non-operational. Through this heat transfer, heat within the processing chamber 42 is more evenly distributed across the contents located therein and the difference between the temperature of the heat distribution element 56 and the temperature of the contents is reduced. As a result, the temperature of the heat distribution element 56 after the soak time more accurately reflects the temperature of the contents of the processing chamber 42. After the soak time has elapsed, the temperature of the heat distribution element 56 is sensed, as shown in step 112. In step 114, the temperature sensed at the end of the sequence is compared to the target temperature from the beginning of the sequence, and the change in temperature is stored in a database or memory 68. It should be understood that one or more parameters of the control sequence 100, such as the dwell time, the soak time, or the time to initially heat the heat distribution element 56 to the target temperature, may vary based on the application.

The change in temperature of the heat distribution element 56 that occurs during a control sequence will vary based on the amount of heat that is transferred to the processing chamber 42 during the control sequence. For example, if the contents of the processing chamber 42 are at a temperature similar to the temperature of the heat distribution element 56, the amount of heat that is transferred from the heat distribution element 56 to the processing chamber 42 during a control sequence will be limited. Therefore, the change in temperature of the heat distribution element 56 will be relatively small. However, if the contents of the processing chamber 42 are substantially cooler than the heat distribution element 56, a greater amount of heat will transfer from the heat distribution element 56. As a result of this increased heat transfer, the change in temperature of the heat distribution element 56 during the control sequence will be larger than when the temperature of the processing chamber 42 is similar to the temperature of the heat distribution element 56.

In an embodiment, the algorithm 66 uses this change in temperature to evaluate whether the temperature within the processing chamber 42 is stable, as shown in step 116 of FIG. 5. As used herein, the temperature within the processing chamber 42 is considered "stable" if the temperature is generally constant within an allowable tolerance. In an embodiment, the algorithm 66 does not rely solely on this change in temperature of the heat distribution element 56 that occurs during a control sequence 100 to determine whether the temperature within the processing chamber 42 is stable. Rather, the algorithm 66 will compare the change in temperature to the change in temperature determined for at least the previously performed control sequence 100 to determine the variation in the determined change in temperature between successive control sequences 100.

If the temperature change determined for two or more successive control sequences is within an allowable tolerance, such as within 1% or alternatively 1° C. for example, the algorithm 66 will determine that the temperature within the processing chamber 42 is stable and at the target temperature. In an embodiment, three sequential changes in temperature must be within the allowable tolerance to determine that the temperature of the processing chamber 42 is at the target temperature. Upon determining that the temperature within the processing chamber 42 is stable, and therefore that the processing chamber 42 is heated to the target temperature, the food processing system 20 may indicate to a user that container 32 has been heated to the target temperature. Alternatively, or in addition, the food processing system 20 may proceed to perform another food processing operation, such as blending for example. If the temperature change associated with successive control sequences 100 is varies by an amount exceed the allowable tolerance, the algorithm 66 will determine that temperature of the processing chamber 42 is not yet stable, and will continue to run additional control sequences until such a determination is made. In an embodiment, even after determining that the temperature within the processing chamber 42 is stable, the algorithm 66 may continue to run continuously during a heating operation to maintain the processing chamber 42 at a desired temperature, such as in the event that cold ingredients are added to the processing chamber 42.

The algorithm 66 described herein reduces the thermal gradient within the processing chamber 42, thereby reducing the total length of time required to heat the processing chamber 42 to a target temperature. In addition, inclusion of a controller 64 capable of running the algorithm 66 increases the accuracy of the temperature detection of the processing chamber 42. This increased accuracy is particularly relevant for applications where one or more of the ingredients provided to the processing chamber 42 are temperature sensitive ingredients. Temperature sensitive ingredients may degrade or evaporate when exposed to high temperatures. For example, alcohol typically boils when heated to a temperature above 82° C. Accordingly, if the food processing system 20 is being used to prepare food that includes alcohol as an ingredient, it is desirable to accurately maintain the temperature of the processing chamber 42 below the boiling temperature of the alcohol to maintain the integrity of the food being prepared.

The food processing system 20 may be operable in one or more modes of operation, each of which is associated with a different maximum temperature of the processing chamber 42. In an embodiment, the food processing system 20 includes a "High" mode of operation where the temperature of the processing chamber 42 is maintained below 100° C., a "Medium" mode of operation where the temperature of the processing chamber 42 is maintained below 82° C., and a "Low" mode of operation where the temperature of the processing chamber 42 is maintained below 71° C. It should be understood that the maximum temperatures identified herein for each mode are intended as an example only and that any relative low, medium, and high temperatures are within the scope of the disclosure.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A food processing system comprising:
    a food processing base;
    an attachment configurable with said food processing base, said attachment including a processing chamber;
    a heat distribution element for transferring heat to a fluid within said processing chamber; and
    a controller associated with the system, said controller configured to:
        heat said heat distribution element to a first temperature;
        perform at least one processing step, said at least one processing step comprising a stirring operation;
        sense a second temperature of said heat distribution element after said performing at least one processing step; and
        compare said first temperature and said second temperature to determine if a fluid temperature in said processing chamber is equal to a target temperature.

2. The food processing system of claim 1, wherein said fluid temperature in said processing chamber is equal to said target temperature when a difference between said first temperature and said second temperature is within an allowable tolerance.

3. The food processing system of claim 2, wherein said allowable tolerance is 1%.

4. The food processing system of claim 1, wherein said attachment further comprises at least one heating element located remotely from said processing chamber.

5. The food processing system of claim 1, wherein said attachment further comprises:
    a container body having a first end and a second end defining said processing chamber; and
    a processing assembly at least partially arranged within said processing chamber.

6. The food processing system of claim 5, wherein said heat distribution element seals said second end of said container body.

7. The food processing system of claim 6, wherein said heat distribution element forms a portion of said container body.

8. The food processing system of claim 6, wherein said processing assembly is connectable to said second end of said container body and said heat distribution element is a portion of said processing assembly.

9. The food processing system of claim 1, further comprising a sensor for detecting said first and second temperatures, said sensor being operably coupled to said controller.

10. The food processing system of claim 1, wherein said target temperature is less than or equal to a maximum allowable temperature.

11. The food processing system of claim 10, wherein said food processing system is operable in a plurality of modes and said maximum allowable temperature is determined in response to a selected mode of said plurality of modes.

12. The food processing system of claim 1, wherein the controller is configured to continue heating said heat distribution element after reaching said first temperature for a dwell time.

13. The food processing system of claim 12, wherein the dwell time is at least 30 seconds.

14. The food processing system of claim 12, wherein the controller is configured to pause the food processing system for a predetermined soak time after performing said at least one processing step.

15. The food processing system of claim 14, wherein the predetermined soak time is 10 seconds.

16. A method of controlling a temperature in a container of a food processing system, the method comprising:
    transferring heat to a processing chamber of the container;
    evaluating a plurality of successive changes in temperature of a heat distribution element associated with the container;
    evaluating a value of each temperature change between each of said plurality of successive changes in temperature to determine if a fluid temperature in said processing chamber is equal to a target temperature;
    performing a plurality of successive control operations, each of said plurality of successive changes in temperature of said heat distribution element being determined for said plurality of successive control operations, wherein determining said change in temperature of said heat distribution element for each of said plurality of successive control operations further comprises:
heating said heat distribution element to a first temperature;
performing at least one processing step, said at least one processing step comprising a stirring operation;
sensing a second temperature of said heat distribution element after said performing at least one processing step; and
comparing said first temperature and said second temperature.

17. The method of claim 16, further comprising maintaining said fluid temperature of said processing chamber below a maximum temperature.

18. The method of claim 17, wherein said maximum temperature varies in response to a mode of operation of the food processing system.

19. The method of claim 17, wherein said maximum temperature is about 100° C.

20. The method of claim 17, wherein said maximum temperature is about 82° C.

21. The method of claim 17, wherein said maximum temperature is about 71° C.

22. The method of claim 16, wherein said fluid temperature of the container is equal to said target temperature when said value of each temperature change between each of said successive changes in temperature is within an allowable tolerance.

23. The method of claim 22, wherein said allowable tolerance is 1%.

24. The method of claim 16, wherein said fluid temperature of the container is not at said target temperature when said value of each temperature change between each of said successive changes in temperature exceeds an allowable tolerance.

25. The method of claim 16, further comprising:
continuing to heat said heat distribution after reaching said first temperature for a dwell time.

26. The method of claim 25, wherein the dwell time is at least 30 seconds.

27. The method of claim 25, further comprising:
pausing the food processing system for a predetermined soak time after performing said at least one processing step.

28. The method of claim 27, wherein the predetermined soak time is 10 seconds.

* * * * *